United States Patent [19]

Junkas et al.

[11] 4,353,182
[45] Oct. 12, 1982

[54] FISHING BOX

[76] Inventors: Ronald J. Junkas, 137 Ridge La., Geneva, Ill. 60134; Robert W. Kyes, P.O. Box 373, Bativia, Ill. 60510

[21] Appl. No.: 226,400

[22] Filed: Jan. 19, 1981

[51] Int. Cl.³ ............................................. A01K 97/00
[52] U.S. Cl. .................................... 43/54.5 R; 43/55; 206/315 R; 224/920; 312/235 R
[58] Field of Search .................. 43/54.5, 55; 206/315; 224/920; 312/235 R, 241, 258, 281; 108/38, 42, 48

[56] References Cited

U.S. PATENT DOCUMENTS

| | | | |
|---|---|---|---|
| 2,153,549 | 4/1939 | Cooper | 43/54.5 R |
| 2,264,744 | 12/1941 | Dunnam | 43/54.5 R |
| 2,823,971 | 2/1958 | Hoyt | 43/54.5 R |
| 3,958,359 | 5/1976 | Doughty | 43/55 |
| 4,023,304 | 5/1977 | Singer | 43/54.5 R |

Primary Examiner—Nicholas P. Godici
Assistant Examiner—M. Jordan
Attorney, Agent, or Firm—John Cyril Malloy

[57] ABSTRACT

A fishing box is disclosed which incorporates the following built-in features: tackle box, seat, life preserver, fishing rod carrier, cooler, worm and minnow bait compartment, fish compartment, lid-table tray, a flip-out side table, a ruler for measuring the lengths of fish, a fish net holder, towel rack, and an accessory attachment for supporting an accessory such as a portable radio.

27 Claims, 9 Drawing Figures

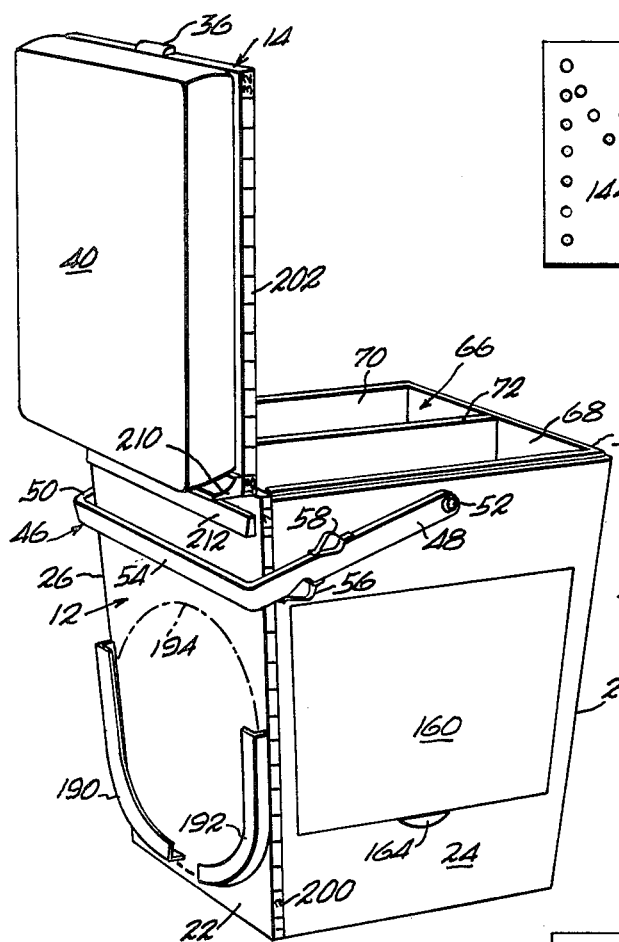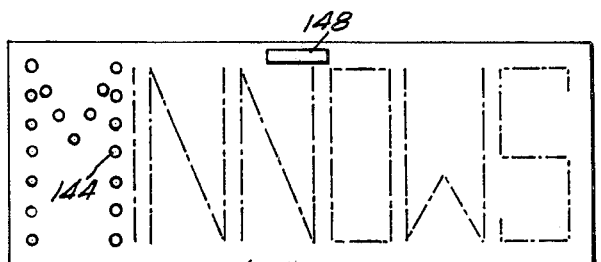
Fig. 7
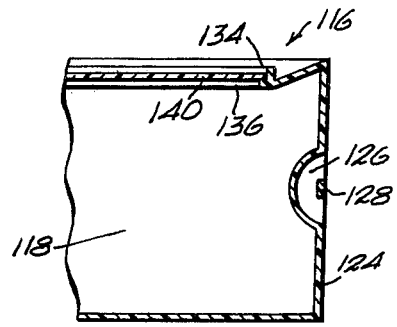
Fig. 9
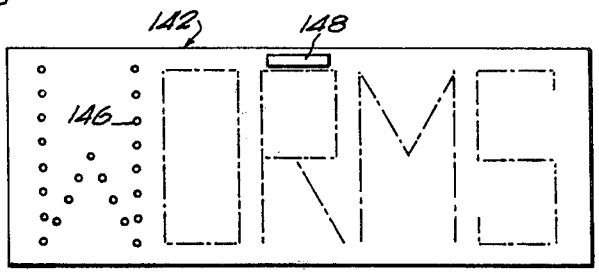
Fig. 8
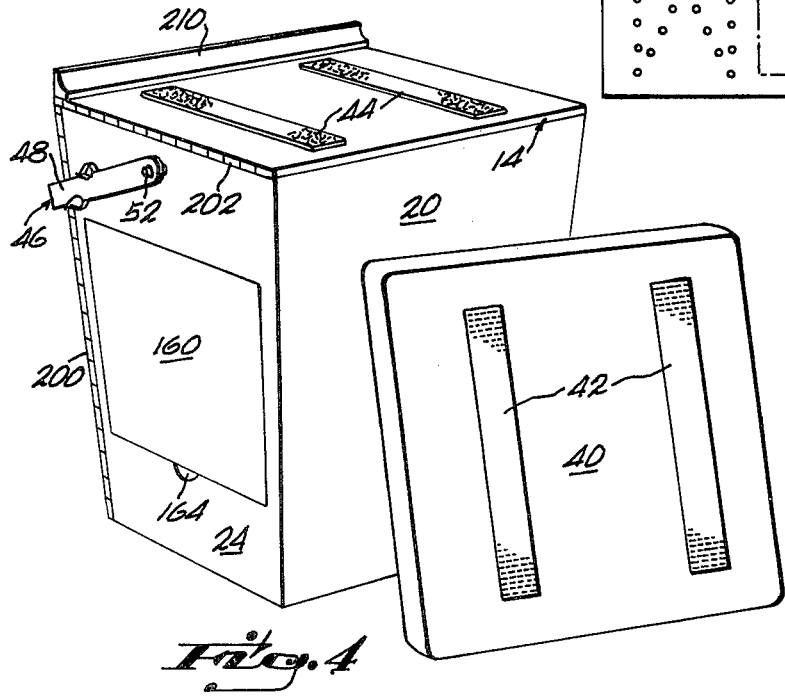

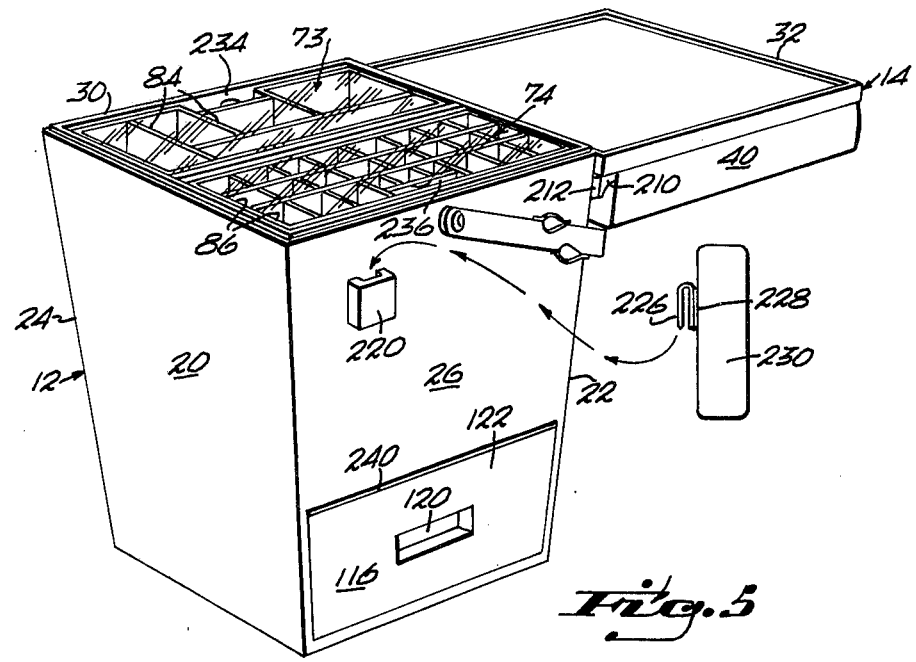
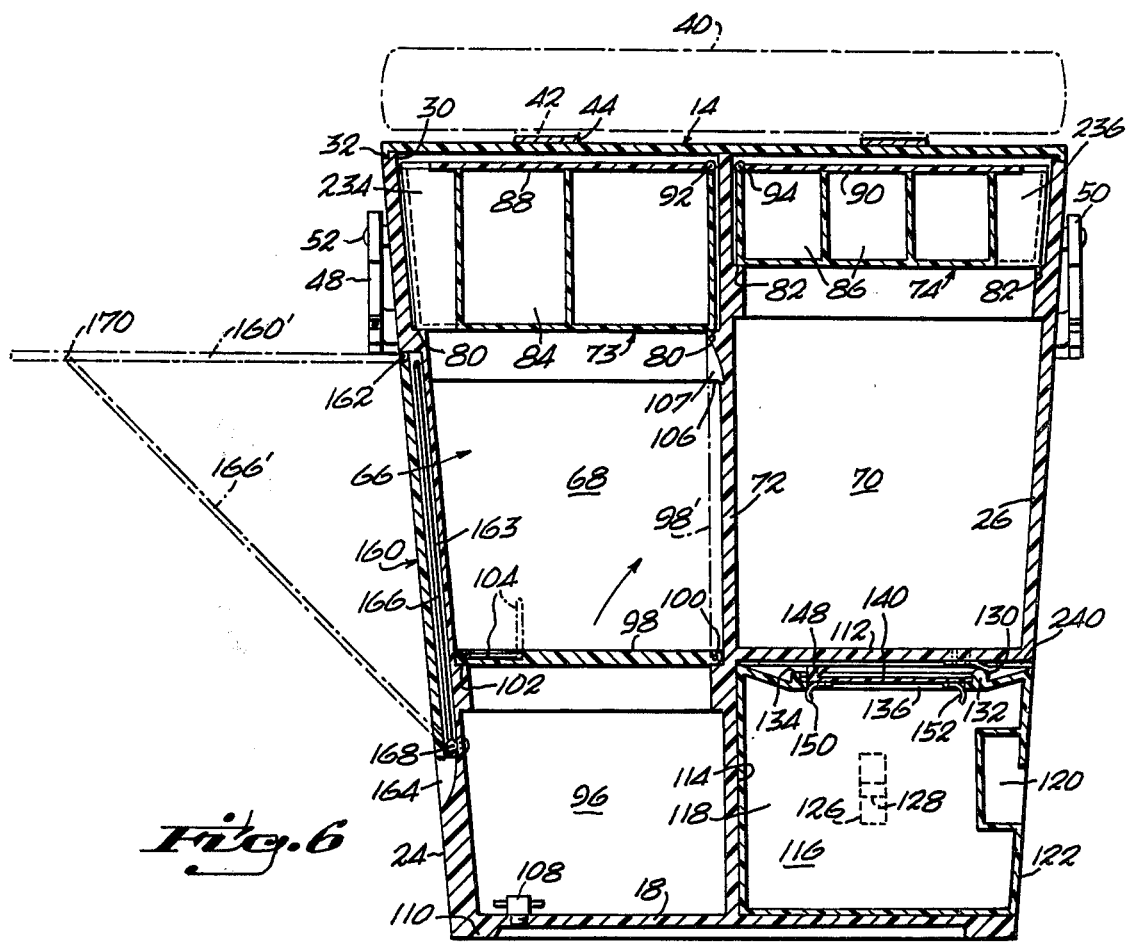

FISHING BOX

BACKGROUND OF THE PRESENT INVENTION

Heretofore, a fishing trip necessitated the transportation of a substantial amount of individual equipment to the fishing area. For example, the equipment generally includes, rods and reels, tackle box, folding chairs or stools, folding table, bait containers, a cooler for food and drinks, a container for the day's fish catch, a fish net, a portable radio, a measuring tape and hand towels.

The principal object of the present invention is to provide a fish box which substitutes for, or accommodates all of the above itemized equipment whereby all of the items may be manually, simultaneously transported by the use of a single handle, pivotally attached to the fishing box.

A further object of the invention is to provide a convenient device whereby all of the fishing essentials may be stored at home in a single unit, thereby obviating the possibility of going on a fishing trip without some of the desired equipment.

DESCRIPTION OF THE DRAWINGS

FIG. 3 is a perspective view of the box, further illustrating the fish net rack, and the use of a measuring strip on the main body and lid thereof;

FIG. 4 is a perspective view, illustrating the Velcro mounting means for the life preserver seat cushion on the box lid;

FIG. 5 is a perspective view of the fish box with the lid open and tackle trays disposed in the open top end thereof;

FIG. 6 is a vertical cross sectional view taken along line 6—6 of FIG. 2;

FIGS. 7 and 8 are top plan views of an alternative pair of lids for use with a removable bait bucket portion of the fishing box; and FIG. 9 is a fragmentary vertical cross sectional view through one end portion of the bait bucket.

DESCRIPTION OF A PREFERRED EMBODIMENT OF THE PRESENT INVENTION

Figure 1:
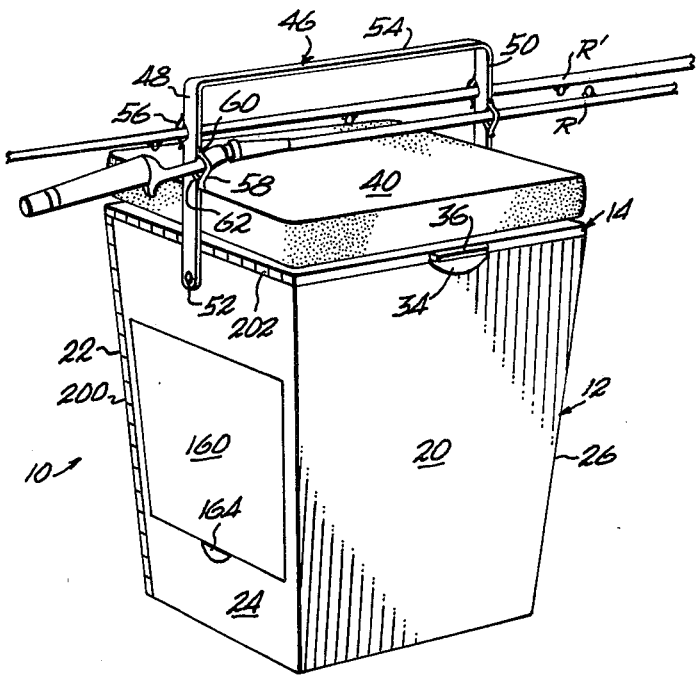
FIG. 1 is a perspective view of the fishing box of the present invention with a pair of fishing rods engaged in spring-clip means on the handle thereof.
Figure 2:
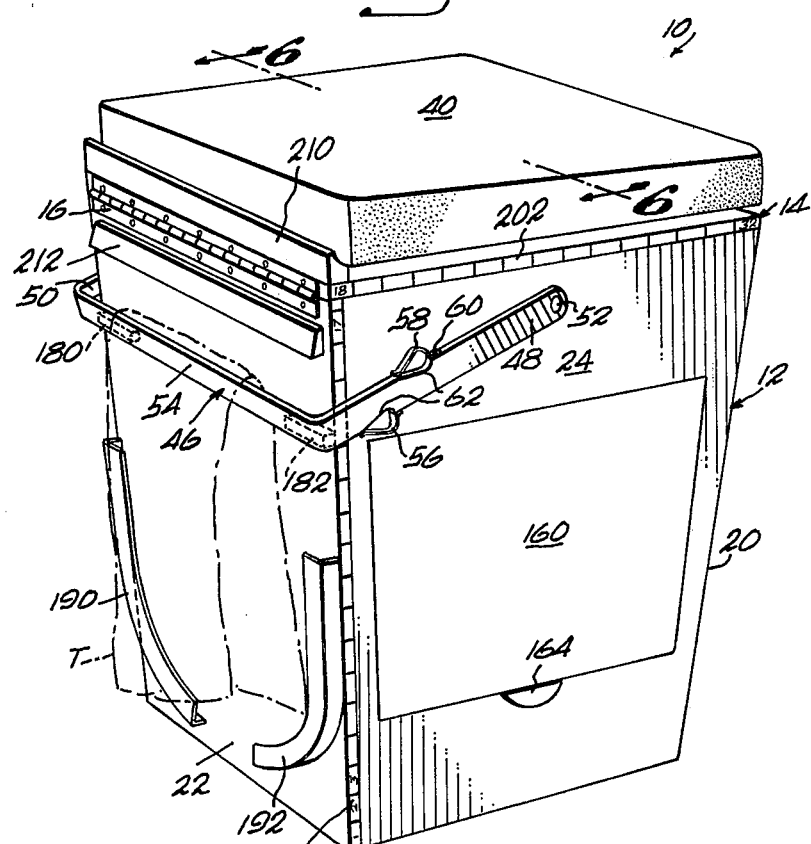
FIG. 2 is a perspective view of the box, illustrating the use of the handle as a towel rack, and a fish net rack extending outwardly from a back wall thereof.

With reference to the drawings, and particularly to FIGS. 1, 2 and 3, the fishing box, indicated generally at 10, includes a main body portion 12 and a lid portion 14, attached by a piano hinge 16 along one top edge of the main body portion 12. The main body portion 12 includes a bottom wall 18, FIG. 6, a front wall 20, FIG. 1, a back hinge wall 22, FIGS. 2 and 3, and first and second side walls 24 and 26, FIGS. 1 through 5.

With particular reference to FIGS. 3 and 5, an upwardly extending lip 30 is defined peripherally about the inner top edges of side walls 20, 22, 24 and 26 and the lid 14 includes a peripheral outer edge, downwardly extending lip 32 to overlap lip 30, when the lid 14 is in a closed position. A finger grip recess 34 is defined in the outer top edge portion of wall 20 to cooperate with a projecting grip means 36 from the lid 14, to facilitate the opening of lid 14.

A seat cushion, preferably in the form of a U.S. Coast Guard approved life preserver 40, is removably secured atop lid 14 by respective pairs of conventional plastic Velcro strips 42 and 44, FIG. 4, secured as by adhesive means, to the top side of lid 14 and bottom side of cushion 40. One pair of strips, such as 42, is provided with the usual hooks and the other pair, such as 44, includes the pile for engagement by the hooks in the conventional manner.

A generally U-shaped handle 46 includes a pair of side arms 48, 50, pivotally attached at respective distal ends at 52, intermediate the top width of side walls 24, 26, and a top span portion 54. A pair of spring clips 56, 58 is secured, as by rivets 60, in a spaced apart relation to each arm 48, 50. The pairs of spring clips 56, 58 cooperate to secure a pair of fishing rods R and R' to the handle 46 as illustrated in FIG. 1. Each arm 48, 50 may be notched as at 62, relative to each spring clip 56, 58, to cooperate with the clips to secure the rods R and R'.

The main body portion 12 defines an inner chamber 66, FIGS. 3 and 6, divided into chamber portions 68, 70 by a central vertical septum 72. Upper end portions of chamber portions 68, 70 are normally occupied by lift-out compartmented tackle trays 73, 74, FIGS. 5 and 6, supported on respective peripheral shoulders 80, 82 defined on the interiors of side walls 20 through 26 and septum 72. The tackle trays 73, 74 each include a plurality of compartments such as 84, 86 to accommodate a wide range of fishing equipment, etc., in a conventional manner. Trays 73, 74 include respective clear plastic lids 88, 90, hinged thereto as at 92, 94. The hinges are preferably of a type which hold or retain the lids 88, 90 in both the open and closed positions.

Chamber portion 68 is provided with a bottom end cooler portion 96 which is defined by an intermediate lid 98, hinged at 100 to septum 72. Lid 98 seats on a peripheral shoulder 102 defined in chamber portion 68 and includes a recessed pivotal handle 104. In its up position 98', the lid snaps under a shoulder 106, permitting use of the entire chamber portion 68 as a cooler or to receive the day's catch of fish for the trip home. A finger grip 107 is provided in septum 72 to release lid 98. A plug 108 is provided in the bottom wall 18 for drainage or flushing purposes, and a peripheral bottom ridge 110 is preferably provided about the outer bottom edge of box 10.

An intermediate horizontal partition 112, FIG. 6, is provided in chamber portion 70 to define a bottom end chamber portion 114 opening through side wall 26 for sliding reception of a removable bait box 116 which is generally rectangular in configuration, defining an inner chamber 118 for the reception of live bait. A recessed finger grip 120, FIGS. 5 and 6, is formed in a front wall 122 thereof for in-out manual movement of bait box 116 relative to chamber 114. As best seen in FIG. 9, one end wall 124 of bait box 116 is recessed at 126 with a center bridge span 128, to permit attachment of a line (not shown) about span 128 for securing the bait box in the water when live minnows or other water supported baits are disposed therein. Any type of conventional snap latch may be employed to hold the bait box 116 in chamber 114, for example, a leaf spring latch 130, FIG. 6, may be secured to partition 112 to engage over a projecting portion 132 of a peripheral rim 134, extending about the top opening 136 of bait box 116.

A pair of lids 140, FIG. 7, and 142, FIG. 8, may be provided for bait box 116. One lid 140 includes a plurality of enlarged air holes 144 therein defining "minnow", the other lid having a plurality of smaller air holes 146 defining "worms." The worm lid holes are smaller because worms require a lesser oxygen supply than minnows. Each lid includes finger grip means, such as 148, in an offset relation to spring latch 130 for removal of the lids from the bait box 116. Any conventional type of snap latch such as leaf springs 150, 152, FIG. 6, may be employed to removably secure the respective lids to bait box 116.

A fold-out table 160 is pivotally hinged at 162 in a cavity 163 in one side wall such as 24 of the fishing box 10, and a finger grip 164 is recessed therein to swing the table to the phantom position 160', FIG. 6. A support rod 166 normally disposed in a diagonal position in cavity 163 between the table 160 and wall 24, is pivotally mounted, on a swivel 168, to side wall 24 for swinging movement to the phantom position 166' for engagement in a detent at 170 to support the table 160 in its extended position.

With particular reference to FIG. 2, a pair of opposed side blocks 180, 182 are defined on a side wall 22 to engage and support the handle 46 in a predetermined spaced relation to said wall 22, in the illustrated position, to permit a towel T or the like to be hung over the main span portion 54 thereof.

With further reference to FIG. 2, and to FIG. 3, a pair of generally arcuate angle members 190, 192 are secured to side wall 22 to define a receptacle for a commercially available collapsible wire fish net, the position of which is schematically illustrated by the broken line 194 in FIG. 3.

As best illustrated in FIGS. 1 and 3, a first measuring ruler portion 200 is defined along one generally vertical edge of the box side wall 24 and a second ruler portion 202 is defined along the corresponding edge of lid 14. In the illustration of FIG. 3, with the lid in an open position, a fish up to 32 inches may be accurately measured, utilizing the aligned measuring ruler portions 200 and 202. Of course, the actual measuring limit is determined by the box dimensions.

Cooperating stop means 210, 212, FIGS. 2, 3 and 5 are secured respectively along the hinge edge of lid 14 and side wall 22 of the main body portion 12 to position the lid 14 in a generally horizontal open position for use as a table, FIG. 5, which is particularly useful in combination with the tackle trays 73, 74 while rigging or dismanteling the fishing equipment.

FIG. 5 illustrates an accessory attachment means in the form of a female receptacle 220, secured as by adhesive means to one side wall such as 26. A male member, such as 226, is secured by adhesive means, such as a double sided pressure sensitive tape 228, to an accessory such as a portable radio 230, whereby the radio may be readily secured to or removed from the side wall 26.

With particular reference to FIGS. 5 and 6, it should be noted that both tackle trays include outwardly positioned open hand grips 234 and 236 in addition to being sized to provide a loose fit relative to their surrounding walls to facilitate their easy removal from the box 12. A sufficient opening is provided between the top of the bait box 116 and the partition wall 112 to insure a sufficient gap therebetween at 240 to provide a circulation of air to the bait in box 118 when it is disposed in the chamber 118.

In one preferred form, as illustrated, the various elements of the fishing box 10, as above described, may be fabricated of a suitable plastic material, as by molding. However, other materials and methods of forming may also be employed.

While one preferred form of the fishing box of the present invention has been herein disclosed, it will be obvious to those skilled in the art that various changes and modifications can be made therein without departing from the true spirit of the invention, as defined in the appended claims.

What is claimed is:

1. A fishing box comprising a main body portion including a bottom wall, and front, back, and first and second side walls, defining an interior chamber with an open top end; a generally vertical septum dividing said chamber into first and second, generally vertically extending chamber portions, a main lid hinged relative to a top edge of said back wall for pivotal movement betweeen open and closed positions relative to said first and second chamber portions; means to support first and second compartmented fishing tackle trays in respective upper end portions of said first and second chamber portions; a second lid pivotally supported in said first chamber portion, intermediate said first tackle tray and bottom wall, and means to seat said lid in a generally horizontal position in a closing relation to a bottom portion of said first chamber portion, and hand grip means carried atop said second lid to swing same from said closing relation to a full open position, relative to said bottom portion; a generally horizontally extending partition, fixed in a closed spanning relation to said second chamber portion, intermediate said bottom wall and second tackle tray, defining a bottom portion of said second chamber portion; a live bait box defining an interior live bait chamber and including an access lid means to said live bait chamber, said live bait box being sized for sliding passage through an access opening through a bottom end portion of said second side wall into said bottom portion of said second chamber portion; seat cushion means for removable fixed attachment atop said main lid, and handle means for pivotal attachment relative to upper end portions of said first and second side walls.

2. The fishing box as defined in claim 1 including a fold-out table normally disposed within a cavity, in a flush relationship in said first side wall, and including a pivotal hinge connection of said fold-out table to said first side wall, within a generally horizontal top edge portion of said cavity, and a support rod pivotally connected to said first side wall, within a lower portion of said cavity, in a manner whereby said support rod is pivotal to an outwardly, upwardly extending position to supportingly engage an underside of said fold-out table, when said table is pivoted about said pivotal hinge to a generally horizontal position.

3. The fishing box as defined in claim 2 including a finger grip cutout in said first side wall in a position to faciliate pivotal movement of said fold-out table from said flush relationship to said horizontal position.

4. The fishing box as defined in claim 1 including a first measuring ruler portion defined along an edge of one of said side walls adjacent said main lid hinged connection, and a second measuring ruler portion defined along a corresponding side edge of said main lid to form a continuation of said first ruler portion when said lid is opened to a generally vertical position.

5. The fishing box as defined in claim 1 wherein said cushion means comprises a U.S. Coast Guard approved life preserver.

6. The fishing box as defined in claim 5 wherein said removable fixed attachment comprises a plurality of Velcro strips, selectively defining hooks and pile, secured as by adhesive means respectively to one side of said cushion means and a top side of said lid in a proper interengaging relationship.

7. The fishing box as defined in claim 1 including means to removably secure at least one fishing rod to said handle means.

8. The fishing box as defined in claim 7 wherein said handle means is generally U-shaped, including a main outer span portion and a pair of opposed side arms extending generally inwardly from respective ends of said span portion to respective points of said side wall pivotal attachment, said arms being of sufficient like lengths to permit pivotal movement of said handle through an arc of a predetermined degree to permit the positioning of said main span portion a predetermined distance below a horizontal plane defined by said lid in a closed position.

9. The fishing box as defined in claim 8 including stop means extending a predetermined distance outwardly from said back wall for engagement by said handle span portion in a full rearwardly pivoted position, said stop means being of a predetermined thickness so as to position said main span portion in a predetermined spaced relation to said back wall.

10. The fishing box as defined in claim 9 wherein said stop means comprises a pair of blocks disposed adjacent respective side edges of said back wall.

11. The fishing box as defined in claim 8 wherein said means to removably secure comprises a first pair of aligned spring clips secured respectively to said pair of side arms, to engage about said one fishing rod, intermediate a length thereof.

12. The fishing box as defined in claim 11 including at least a second pair of aligned spring clips secured respectively to said pair of side arms in a spaced relation to said first pair of spring clips to engage about a second fishing rod.

13. The fishing box as defined in claim 12 including a cooperating notch in each of said pair of side arms, positioned relative to each of said spring clips.

14. The fishing box as defined in claim 1 including a first stop strip secured along a top rear end edge of said lid, adjacent said hinged connection, and a cooperating second stop strip fixed along an upper end portion of said rear wall, adjacent said hinged connection, for engagement by said first stop strip when said lid is fully opened, to position the lid in said fully opened position in a generally aligned parallel relation to said open top end.

15. The fishing box as defined in claim 1 including a pair of generally arcuate angular members extending outwardly from said back wall, said angular members being cooperatingly positioned to define a receptacle for slide-in reception of a conventional, commercially available collapsible fish net.

16. The fishing box as defined in claim 1 wherein said access lid means includes a first live bait box lid, including snap latch means to removably secure said first lid in a closing relation to a top opening in said live bait box.

17. The fishing box as defined in claim 16 including a plurality of air holes in said first live bait box lid, each of said holes being of predetermined first diameter.

18. The fishing box as defined in claim 17 wherein said holes are positioned to define the word "minnows."

19. The fishing box as defined in claim 16 including a second live bait box lid, including snap latch means to removably secure said second bait box lid in a closing relation to said bait box top opening.

20. The fishing box as defined in claim 19 including a plurality of air holes in said second live bait box lid, each of said holes being of a predetermined second diameter.

21. The fishing box as defined in claim 20 wherein said holes are positioned to define the word "worms."

22. The fishing box as defined in claim 1 including at least one female receptacle secured, as by adhesive means to one of said side walls, and at least one male member, for attachment by suitable adhesive means, such as a double sided pressure sensitive tape, to an accessory, such as a radio, for engagement in said male member.

23. The fishing box as defined in claim 1 wherein each of said tackle trays includes a transparent lid, suitably hinged thereto.

24. The fishing box as defined in claim 23 wherein each of said tackle trays includes outwardly positioned cutout hand grip portions for removal and insertion purposes relative to said chamber portions.

25. The fishing box as defined in claim 1 wherein said means to support comprises shoulder means defined within upper portions of said first and second chamber portions.

26. The fishing box as defined in claim 1 wherein said means to seat comprises shoulder means defined within a lower portion of said first chamber portion.

27. The fishing box as defined in claim 1 including a removable drain plug in said bottom wall, within said first chamber portion bottom portion.

* * * * *